UNITED STATES PATENT OFFICE.

JOHN CARSTAIRS, OF BRADFORD, ENGLAND.

PROCESS OF SEPARATING PROTEIDS FROM NON-NITROGENOUS BODIES.

SPECIFICATION forming part of Letters Patent No. 713,395, dated November 11, 1902.

Application filed January 11, 1902. Serial No. 89,380. (No specimens.)

*To all whom it may concern:*

Be it known that I, JOHN CARSTAIRS, a subject of the King of Great Britain, and a resident of Bradford, England, have invented a new and Improved Process for the Separation of Proteids from Non-Nitrogenous Bodies, of which the following is a full, clear, and exact description.

The object of my invention is to provide a new and improved process for the separation of such proteids as albumen, fibrin, and the like from fat, oil, and other non-nitrogenous bodies.

The invention will be fully described hereinafter and the features of novelty pointed out in the appended claims.

The substance containing the albumen, fibrin, or other nitrogenous proteid, together with fat and oil, is first comminuted, if solid, and then intimately mixed with a saturated solution of one or more of the alcohols of the aromatic group in ethyl or methyl alcohol. I preferably use a saturated solution in methyl-alcohol of nine parts of phenyl-alcohol ($C_6H_5HO$) and one part of benzyl-alcohol, ($C_6H_5CH_2HO$.) The mixture thus obtained is gradually raised to the boiling-point and allowed to boil for some time. As a result of the boiling of the proteids and alcohols the nitrogenous matter will be solidified, whereupon the fat and oil, which have been liberated, can be drawn off.

When the substance containing the proteid and the fat or oil is more or less liquid, it is intimately mixed with a saturated solution of an aromatic alcohol in ethyl or methyl alcohol. As in the previous case, I prefer to use a saturated solution in methyl-alcohol of nine parts of phenyl-alcohol ($C_6H_5HO$) and one part of benzyl-alcohol, ($C_6H_5CH_2HO$.) The mixture is liquefied by raising it to a sufficient temperature and is kept at this temperature and constantly stirred for some time. The nitrogenous matter will thus be precipitated, so that the oil or melted fat can be decanted.

In the manufacture of fish-guano it is most desirable that the entire nitrogenous matter in the fish should be retained in the guano, while in the oil such nitrogenous matter is an injurious ingredient. In applying my process to the separation of this nitrogenous matter the fish is comminuted and mixed with about two per cent. of its weight of the solution of the aromatic alcohol in ethyl and methyl alcohol. Thus treated the fish is boiled in a closed vessel for a period of one to two hours. Fat or oil practically free from nitrogenous matter will then rise to the top of the vessel and float, so that it can be decanted. Animal or vegetable oils can be refined by mixing them with from one to two per cent. of their weight of the solution of aromatic alcohol in ethyl or methyl alcohol. The mixture is then raised to a temperature at which the oil becomes perfectly liquid and is maintained in this condition, while constantly stirred, until precipitation ceases. The ethyl or methyl alcohol of the solvent can be recovered from the oil by distillation and can be used over again.

Although I prefer to dissolve aromatic alcohol in methyl-alcohol, I desire it to be understood that any alcohol of the methyl group having the generic formula of $C_nH_{2n}+1OH$ may be used.

Having thus described my invention, I claim as new and desire to secure by Letters Patent—

1. The herein-described process of separating nitrogenous proteids from non-nitrogenous fats or oils, which consists in mingling the combined nitrogenous proteid and the fat or oil with a solvent comprising a saturated solution in methyl-alcohol, of nine parts of phenyl-alcohol and one part of benzyl-alcohol, and heating the resulting mixture to the point of liquefaction.

2. The herein-described process of separating nitrogenous proteids from non-nitrogenous fats or oils, which consists in mingling the combined nitrogenous proteid and the fat or oil with a solvent comprising methyl-alcohol, phenyl-alcohol and benzyl-alcohol, and heating the resulting mixture to the point of liquefaction.

3. The herein-described process of separating nitrogenous proteids from non-nitrogenous fats or oils, which consists in mingling the combined nitrogenous proteid and the fat or oil with a solvent comprising an alcohol of the aromatic group and an alcohol of the parffin group and heating the resulting mixture to the point of liquefaction.

4. In the process of separating nitrogenous proteids from non-nitrogenous fats or oils, subjecting the combined proteid and fat or oil to the action of an aromatic alcohol dissolved in an alcohol of the paraffin group.

5. The herein-described process of separating nitrogenous proteids from fats or oils, which consists in mixing the combined proteid and fat or oil with alcohol, and heating the resulting mixture to the point of liquefaction.

6. The herein-described process of separating nitrogenous proteids from fats or oils, which consists in mixing the combined proteid and fat or oil with a solvent containing an alcohol of the aromatic group, and heating the resulting mixture to the point of liquefaction.

In testimony whereof I have signed my name to this specification in the presence of two subscribing witnesses.

JOHN CARSTAIRS.

Witnesses:
J. HERBERT HALEY,
WILLIAM HAIGH.